June 30, 1925.
J. T. ZICKOS ET AL
1,544,120
CONFECTION APPARATUS
Filed Sept. 27, 1924
2 Sheets-Sheet 1
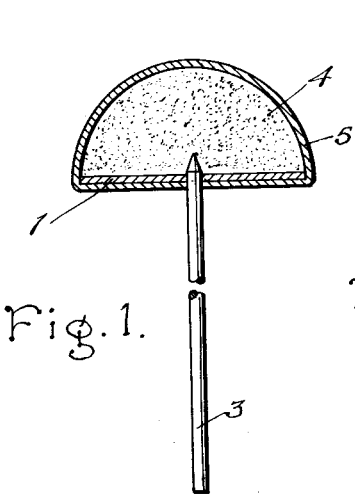
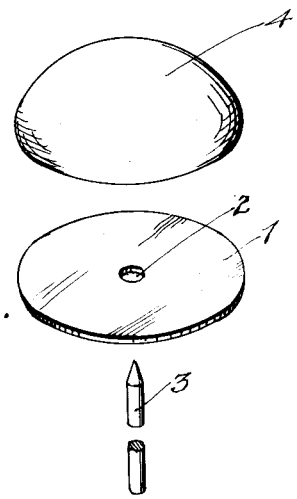
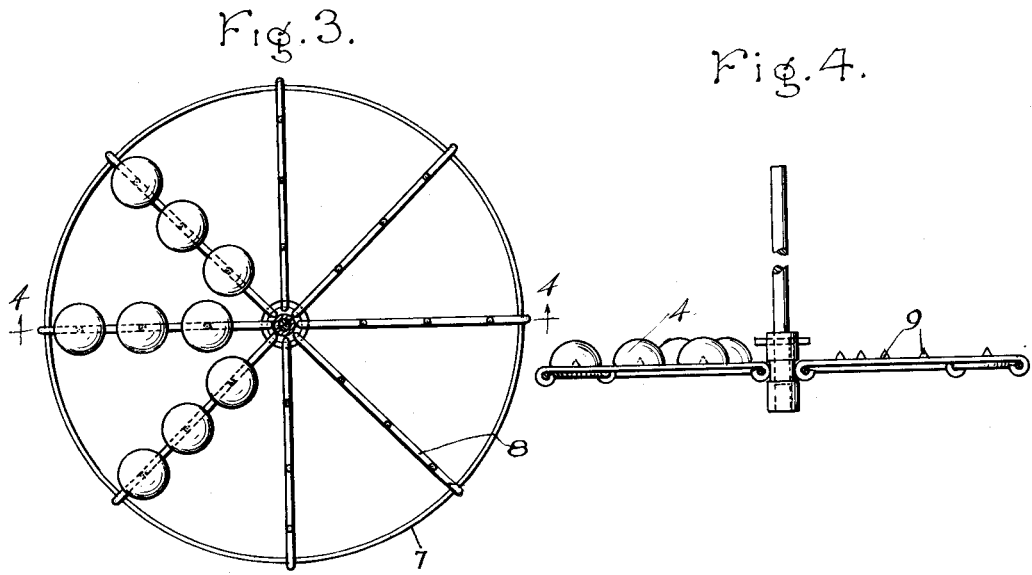
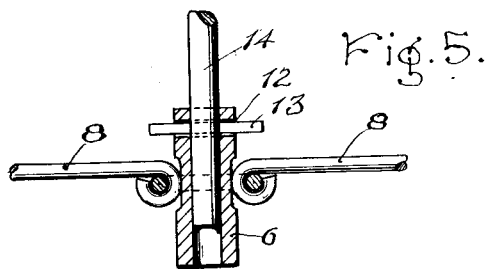
Inventor
J.T. Zickos &
W.T. Zickos
Attorney June 30, 1925.

J. T. ZICKOS ET AL 1,544,120

CONFECTION APPARATUS

Filed Sept. 27, 1924      2 Sheets-Sheet 2

Inventor
J.T.Zickos &
W.T.Zickos

Attorney

Patented June 30, 1925.

1,544,120

UNITED STATES PATENT OFFICE.

JOHN TSATSI ZICKOS AND WILLIAM TSATSI ZICKOS, OF FULTON, MISSOURI, ASSIGNORS OF ONE-THIRD TO THOMAS HARRISON GRANT, OF FULTON, MISSOURI.

CONFECTION APPARATUS.

Application filed September 27, 1924. Serial No. 740,319.

*To all whom it may concern:*

Be it known that JOHN TSATSI ZICKOS and WILLIAM TSATSI ZICKOS, citizens of Albania, residing at Fulton, in the county of Callaway and State of Missouri, have invented certain new and useful Improvements in Confection Apparatus, of which the following is a specification.

This invention relates to an improved confection apparatus involving particularly a wafer adapted to be removably arranged upon a handle in the form of a stick, the wafer serving as a support for an appropriately shaped mass of ice cream, which following its application to the wafer is dipped into material to provide an edible outer coating of a character capable of hardening to an appreciable extent in the atmosphere, thus protecting the ice cream filler until it is ready for use.

Confections of this general character have been heretofore proposed, but each and all lack the more or less rigid base on which the ice cream may be built up, and which, as will appear from the following specification, provides a convenient means for the application of the ice cream, for supporting the same following its initial application, and for maintaining the mass in appropriate form for convenient dipping into the coating and for supporting a series of the coated confections in the chilling or freezing chamber and until required for distribution.

In carrying out the method of making the ice cream, there is provided a series of carriers, each of which is adapted to removably receive a base in convenient position to permit the application of the desired quantity of ice cream thereto, the carrier with its plurality of ice cream covered bases being then dipped as a whole into the coating, removed therefrom and permitted to drain, and then placed as a whole in a chilling chamber for cooling to the proper point, following which the carriers, with the now completed confection, may be arranged in a container or packed for transportation. The carriers permit the removal of single confections at will when such are desired for use or sale, the handle being applied immediately following the removal of the confection from the carrier.

The invention is illustrated in the accompanying drawings, in which:

Fig. 1 is a sectional view of the completed confection, the handle being shown in elevation.

Fig. 2 is a perspective view showing the various parts of the confection in spaced relation to indicate their relative positions.

Fig. 3 is a plan view of the carrier, a plurality of bases being shown thereon.

Fig. 4 is a side elevation of the same, the completed confections being shown in position.

Fig. 5 is a broken sectional view of the carrier showing a means by which the individual carrier is handled.

Figure 6:
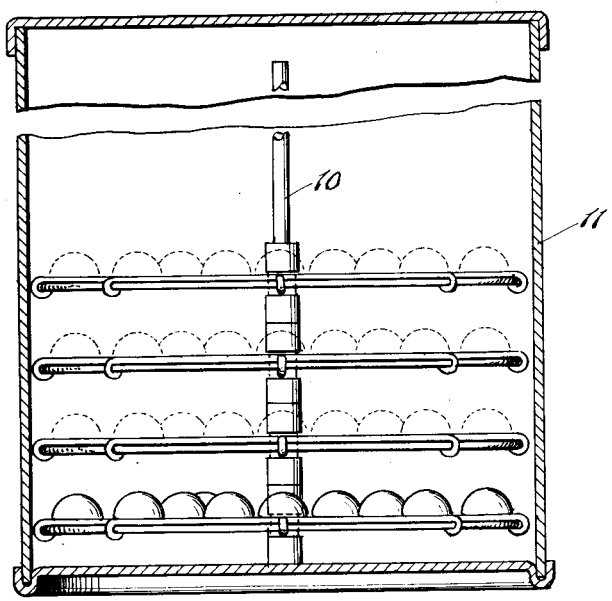
Fig. 6 is a sectional view of a container showing a plurality of carriers arranged therein.

The improved confection comprises a non-edible base 1, preferably of paste board or the like, and preferably formed with a central hole 2 adapted to snugly receive a handle 3 preferably in the form of a pointed stick. In making up the confection proper, a mass of ice cream, indicated at 4, is placed upon the base 1, the ice cream preferably covering the base and being rounded above the same as clearly shown in Fig. 1. A coating 5 of edible material, preferably chocolate, envelops the ice cream and serves to protect the same against melting and permits the confection to be handled during sale.

The invention is particlarly concerned with the apparatus, whereby a large number of confections may be conveniently made and handled in a simple expeditious manner. The apparatus involves a carrier, comprising a central support 6 and an annular ring 7 surrounding the support and connected thereto by a series of radiating arms 8. The arms 8 are formed with upstanding spurs or points 9 of a size to more or less snugly receive the openings 2 of the bases 1, the connection between the spurs and bases being sufficient to hold the bases in substantial horizontal relation on the carrier, as indicated in Fig. 3.

In the forms shown in Figs. 5 and 6, the central supports 6 are of hollow or sleeve-like form, whereby they may be slidably arranged upon a rod 10 extending vertically and centrally of a container 11, the supports 6 projecting sufficiently above and below the radial arms 8 to space the arms of the respective carriers when the latter are arranged in the container. Each central support 6 is formed near the upper end with a transverse opening 12 adapted to receive a pin 13, which is also designed to pass through a temporary handle bar 14, whereby any particular carrier may, following its withdrawal from the container, or while being otherwise handled, be conveniently moved from place to place.

Figure 7:
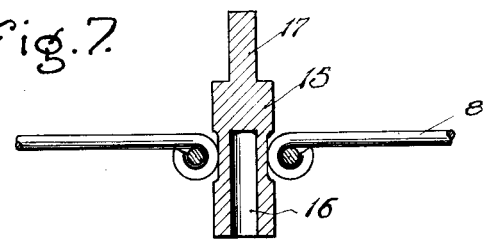
Fig. 7 is a broken sectional view showing a modified form of carrier support.
Figure 8:
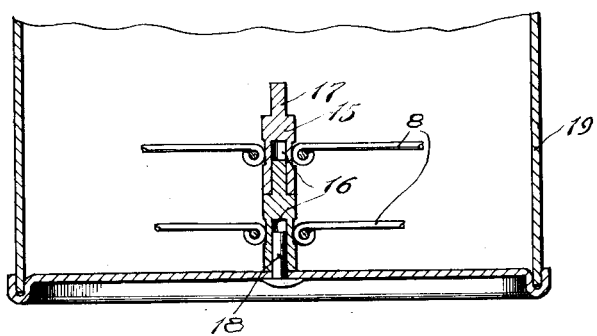
Fig. 8 is a broken sectional view of a container with superimposed carriers of the modified form arranged therein.

In Figs. 7 and 8, the carrier is identical with the form previously described, except that the central support, here indicated at 15, is formed with a longitudinal bore 16, extending from the lower end of the support throughout a portion of the length thereof, the upper end of the modified form of support being reduced to provide a projection 17 of a size to seat in the bore 16. In this form, the lowermost carrier is arranged upon a stud 18 secured in the bottom of the container 19 and the superimposed carriers are held in proper relative positions through the cooperation of their longitudinal bores 16 with the projection 17 of the next lowermost carrier, as clearly shown in Fig. 8.

In carrying out the method of making the confection, a series of bases 1 are applied to a carrier in the manner described. Ice cream, preferably by use of a suitable dipper, is then placed on each base, and the carrier, with the ice cream filled bases, is then dipped into the liquid mass of coating. The carrier is then withdrawn from the coating and allowed to drain and is then placed as an entirety in a refrigerating chamber for chilling to the desired extent. Following a proper cooling, the carriers, as a whole, are placed in the packing containers, which, if desired, may be artificially cooled by any external means and may thus be retained until desired for sale or other use, or may be shipped in such containers, if desired. In dispensing the confection, the completed article is merely lifted from the spur of the carrier and the handle 3 applied by forcing the same through the opening 2 in the base.

It is to be particularly noted that the carrier is of wire or similar construction to avoid any excess material which would otherwise tend to collect the chocolate coating during the dipping operation, and thus to some extent waste such coating. The carriers enable the confection to be constructed, chilled, stored and dispensed practically without necessitating the direct handling of the confection, which aside from its sanitary advantage is important as it avoids any tendency to break the coating, which at best is of a fragile nature. It is of course apparent that the application of the base 1 to the spurs 9 of the carrier serves to maintain the opening 2 at all times clear for the reception of the stick, notwithstanding the dipping operation, and that the confection in its removal from the carrier may be handled by the storekeeper by lifting the same by means of the base, thus avoiding direct contact with the confection proper.

Claims:

1. An apparatus for constructing ice cream coated confections, comprising a carrier formed with a series of radiating arms, means on each arm to removably support a base with the upper surface of the base entirely free for the application of an edible mass thereto, and a central support by means of which the carrier may be handled.

2. An apparatus for constructing ice cream coated confections, comprising a carrier formed with a series of radiating arms, means on each arm to removably support a base with the upper surface of the base entirely free for the application of an edible mass thereto, and a central support by means of which the carrier may be handled, said central support being formed to support the carriers in superimposed spaced relation in a container.

3. An apparatus of the class described, including a carrier having a central support, arms radiating therefrom, and an annular ring to which the outer ends of the arms are secured, each of said arms being formed with a spur to cooperate with an opening formed in a base for the confection to support said base with its upper surface free of obstruction.

In testimony whereof we affix our signatures in the presence of two witnesses.

JOHN TSATSI ZICKOS.
WILLIAM TSATSI ZICKOS.

Witnesses:
  PEARL GOOLDY,
  EMMA ADCOCK.